United States Patent Office 3,808,179
Patented Apr. 30, 1974

3,808,179
OXYGEN-PERMEABLE CONTACT LENS COMPOSITION, METHODS AND ARTICLE OF MANUFACTURE
Norman G. Gaylord, New Providence, N.J., assignor to Polycon Laboratories, Inc.
No Drawing. Filed June 16, 1972, Ser. No. 263,651
Int. Cl. C08f 15/14
U.S. Cl. 260—86.1 E        1 Claim

ABSTRACT OF THE DISCLOSURE

Contact lenses are fabricated from a copolymer of a fluoroalkyl acrylic ester and an alkyl acrylate or methacrylate. The copolymer has increased oxygen permeability.

---

This invention relates to novel copolymer compositions.

In another aspect, the invention relates to methods for increasing the oxygen permeability of polymerized acrylates and methacrylates.

In still another aspect, the invention concerns contact lenses having increased oxygen permeability.

In yet another respect, the invention relates to wettable contact lens materials.

In a further aspect, the invention concerns oxygen-permeable, wettable transparent copolymers which can be cast, molded or machined to provide improved contact lenses.

The prior art teaches the use of many different polymeric materials in contact lenses. However, although these polymers possess the optical clarity necessary for corrective lenses, they suffer from other characteristics which reduce their potential utility.

Polymethylmethacrylate is rigid and durable but relatively impermeable to oxygen. The hydrogel materials based on hydrophilic polymers such as polyhydroxyethylmethacrylate are soft and have poor durability. In addition, they provide an environment which is favorable for bacterial growth and are also relatively impermeable to oxygen.

Silicone rubber is soft and resilient and is highly permeable to oxygen. However, due to the low strength of polysiloxanes, a filler which increases the refractive index of the mixture, must be added to improve the durability. Further, the precision machining and polishing which is necessary in the fabrication of a corrective contact lens is extremely difficult with the elastomeric silicone rubbers.

Accordingly, it would be highly desirable to provide a polymeric material suitable for use in fabricating contact lenses having increased oxygen permeability, improved mechanical strength, and which is sufficiently rigid to permit precision machining and polishing. I have now discovered novel copolymer materials which possess these properties.

The novel compolymers which I have discovered are prepared by copolymerizing fluoroalkyl acrylates and methacrylates with alkyl acrylates and methacrylates.

The fluoroalkyl ester comonomers used to prepare the copolymers of the invention have the structural formula

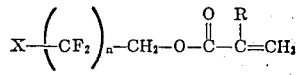

wherein X is selected from the class consisting of hydrogen and fluorine, R is selected from the class consisting of hydrogen and methyl groups, and $n$ is an integer from 1 to 17.

The comonomers which form the copolymer used in the practice of the invention are esters of acrylic and methacrylic acids with an alkanol having from 1 to 20 carbon atoms.

Representative fluoroalkyl ester comonomers include both 1,1-dihydro compounds of the structure

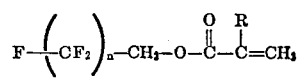

and 1,1,ω-trihydro compounds of the structure

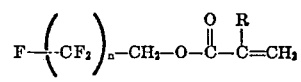

wherein R and $n$ have the meanings previously assigned.

Representative fluoroalkyl acrylic esters include acrylic and methacrylic acid esters of 1,1-dihydrofluoropropanol,
1,1-dihydrofluorobutanol,
1,1-dihydrofluoropentanol,
1,1-dihydrofluorohexanol,
1,1-dihydrofluoroheptanol,
1,1-dihydrofluorooctanol,
1,1-dihydrofluorononanol,
1,1-dihydrofluorodecanol,
1,1-dihydrofluoroundecanol,
1,1-dihydrofluorododecanol,
1,1-dihydrofluorotridecanol,
1,1-dihydrofluorotetradecanol,
1,1-dihydrofluoropentadecanol,
1,1-dihydrofluorohexadecanol,
1,1-dihydrofluorooctadecanol,
1,1,3-trihydrofluoropropanol,
1,1,4-trihydrofluorobutanol,
1,1,5-trihydrofluoropentanol,
1,1,6-trihydrofluorohexanol,
1,1,7-trihydrofluoroheptanol,
1,1,8-trihydrofluorooctanol,
1,1,9-trihydrofluorononanol,
1,1,10-trihydrofluorodecanol,
1,1,11-trihydrofluoroundecanol,
1,1,12-trihydrofluorododecanol,
1,1,13-trihydrofluorotridecanol,
1,1,14-trihydrofluorotetradecanol,
1,1,15-trihydrofluoropentadecanol,
1,1,16-trihydrofluorohexadecanol,
1,1,17-trihydrofluoroheptadecanol and
1,1,18-trihydrofluorooctadecanol.

Representative examples of the alkanol acrylate and methacrylate comonomers include methyl acrylate and methacrylate, ethyl acrylate and methacrylate, propyl acrylate and methacrylate, isopropyl acrylate and methacrylate, butyl acrylate and methacrylate, amyl acrylate and methacrylate, hexyl acrylate and methacrylate, heptyl acrylate and methacrylate, octyl acrylate and methacrylate, 2-ethylhexyl acrylate and methacrylate, nonyl acrylate and methacrylate, decyl acrylate and methacrylate, undecyl acrylate and methacrylate, lauryl acrylate and methacrylate, cetyl acrylate and methacrylate and octadecyl acrylate and methacrylate.

The copolymers used in practicing this invention consist of one or more fluoroalkyl ester or comonomers copolyerized with one or more alkanol ester comonomers as above defined. The copolymer is comprised of from 10 to about 90 parts by weight of the fluoroalkyl ester and from 10 to about 90 parts by weight of the alkanol ester.

The closest prior art of which I am aware is U.S. Pat. 3,282,905 which discloses mechanical mixtures of 1,1,2,2-tetrahydroperfluoro acrylate and methacrylate homopolymers with alkyl acrylate or alkyl methacrylate homopolymers, useful as water and oil repellent textile coatings.

The copolymers of the invention are prepared by contacting the mixture of comonomers with a free-radical generating polymerization initiator of the type commonly used in polymerizing ethylenically unsaturated compounds. Representative free-radical polymerization initiators include:

acetyl peroxide
lauroyl peroxide
decanoyl peroxide
caprylyl peroxide
benzoyl peroxide
tertiarybutyl peroxypivalate
diisopropyl peroxycarbonate
tertiarybutyl peroctoate
$\alpha,\alpha'$-azobisisobutyronitrile Conventional polymerization techniques can be employed to produce the novel copolymers. The comonomer mixture containing between about 0.05–2% by weight of the free-radical initiator is heated to a temperature between 30° C.–100° C., preferably below 70° C., to initiate and complete the polymerization. The polymerization can be carried out directly in a contact lens mold to form a lens generally having the desired configuration. Alternatively, the polymerization mixture can be heated in a suitable mold or container to form discs, rods or sheets which can then be machined to the desired shape using conventional equipment and procedures employed for fabricating lenses from polymethyl methacrylate. The temperature is preferably maintained below 70° C. in order to minimize the formation of bubbles in the copolymer. Instead of employing the bulk polymerization techniques described above, one can employ solution, emulsion or suspension polymerization to prepare the novel copolymers, using techniques conventionally used in the preparation of polymers from ethylenically unsaturated monomers. The copolymer thus produced may be extruded, pressed or molded into rods, sheets or other convenient shapes which are then machined to produce the contact lenses.

The novel copolymers have substantially increased oxygen permeability in comparison to conventional contact lens materials. For example, a copolymer comprising 35 parts 1,1,9-trihydrofluorononyl methacrylate and 65 parts of methyl methacrylate has an oxygen permeability of 100 cc.-mil/100 in.$^2$/24 hr./atm. compared to an oxygen permeability of 34 for polymethylmethacrylate and 13 for polyhydroxyethylmethacrylate. These oxygen permeability values were determined in accordance with ASTM D1434, using a tester which has 3 "Dow" cell pressure change detection units. Discs were cut to proper size to fit the tester, placed in the apparatus and conditioned a minimum of 16 hours under both vacuum and oxygen. Immediately following the conditioning period, the test was performed by plotting a curve of cell pressure versus time. The slope of the curve was then used to calculate the oxygen transmission rate. In general, the oxygen permeability of the copolymers of the invention is at least two times to as much as one hundred times higher than that of lenses prepared from polymethylmethacrylate or the so-called "hydrogel" lenses prepared from polyhydroxyethylmethacrylate.

While some of the novel copolymers are inherently wettable by human tears, it may be necessary to improve the wettability of others. This can be accomplished by several alternate methods. For example, wettability can be imparted to the copolymer by the addition of from about 0.1% to about 10% by weight of one or more hydrophilic monomers to the copolymerization mixture. Such monomers include hydroxyalkyl acrylates and methacrylates wherein the alkyl group contains 1 to 4 carbon atoms, acrylic and methacrylic acid, acrylamide, methacrylamide, N-methylolacrylamide, N-methylolmethacrylamide, glycidyl, acrylate and methacrylate and N-vinylpyrrolidone. Alternatively, the wettability of the surface of contact lenses made from the novel copolymers can be improved by the application of a wetting agent such as, for example, a dilute aqueous solution of alkyldimethylbenzylammonium chloride, by exposure of the surface to a corona discharge or by chemical treatment of the surface with a strong oxidizing agent such as nitric acid.

The rigidity of the contact lenses prepared from materials useful in the practice of this invention may be varied by changing the ratio of comonomers and/or their chemical composition. Thus, contact lenses prepared from acrylate monomers are more flexible than those prepared from methacrylate monomers. A copolymer of a fluoroalkyl methacrylate and an alkyl methacrylate may be fabricated into a contact lens which is more rigid than a lens prepared from the copolymer of the corresponding acrylates. The lower the alkyl acrylate or methacrylate content of the copolymer, the more flexible the contact lens prepared therefrom.

The rigidity of a contact lens prepared from the materials useful in the practice of this invention may be increased, if desired, by the incorporation into the copolymer composition of 0.01% to about 2% by weight of a crosslinking monomer such as a polyol dimethacrylate or diacrylate or a polyol acrylic ester of higher functionality, for example, ethylene glycol dimethacrylate, butylene glycol dimethacrylate, neopentyl glycol diacrylate and pentaerythritol triacrylate or tetra-acrylate.

The refractive index is an important but noncritical characteristic of a contact lens. Thus, the refractive index of polymethylmethacrylate, the polymer most widely used in the fabrication of contact lenses, is 1.49. The refractive indices of the copolymers useful in the practice of this invention may be varied between 1.35 and 1.50 by varying the ratio and nature of the comonomers. In general, increasing the fluoroalkyl monomer content of the copolymer will decrease its refractive index. Increasing the chain length of the alkyl group in the comonomer alkyl acrylate or methacrylate produces copolymers having a lower refractive index.

The following examples are presented to illustrate the practice of the invention and not as an indication of the limits of the scope thereof.

EXAMPLE 1

A 20.0 g. mixture of 35 parts of 1,1,9-trihydrofluorononyl methacrylate and 65 parts of methyl methacrylate, together with 0.05 ml. of tert-butyl peroxypivalate is placed in a polypropylene Petri dish to a height of ⅛ inch. The dish is covered and placed in a vacuum oven which has been purged with nitrogen. The oven is sealed and the temperature is maintained at 50° C. for 20 hours. The copolymer disc is colorless, transparent, hard and rigid. The oxygen permeability is 100 cc.-mil/100 in.$^2$/24 hr./atm.

The oxygen permeability of a disc of poly(methyl methacrylate) is 34 cc.-mil/100 in.$^2$/24 hr./atm. while that of a disc of poly(hydroxyethyl methacrylate) is 13 cc.-mil/100 in.$^2$/24 hr./atm.

A cylindrical plug, ¼ inch thick and ½ inch in diameter, is prepared by copolymerizing the 35/65 1,1,9-trihydrofluorononyl methacrylate/methyl methacrylate mixture in a suitable mold at 80° C. for 3 hours. The plug is machined, cut, polished and finished to a lens with a concavo-convex configuration. The lens is readily wetted with water without further treatment.

EXAMPLES 2-5

Mixtures (1 ml.) of 1,1,9-trihydrofluorononyl methacrylate (FNMA), methyl methacrylate (MMA) and hydroxyethyl methacrylate (HEMA) containing 0.007 ml. tert-butyl peroctoate are polymerized in polyethylene caps at 90° C. for 1 hour. The properties of the polymerized plugs are shown in the following table:

| Example number | Composition, wt. percent | | | Properties [1] |
|---|---|---|---|---|
| | FNMA | MMA | HEMA | |
| 2 | 40 | 50 | 10 | T, H, R, W |
| 3 | 50 | 45 | 5 | T, H, R, W |
| 4 | 60 | 30 | 10 | T, H, SR, W |
| 5 | 70 | 20 | 10 | T, H, SR, W |

[1] T=transparent; H=hard; R=rigid; SR=semi-rigid; W=wettable.

The plugs are machined and finished in the usual manner to lenses with a concave surface on one side and a convex surface on the opposite side. All lenses are easily wetted by water.

EXAMPLES 6 AND 7

A transparent, hard and rigid plug is obtained by polymerizing a mixture of 50 parts of 1,1,9-trihydrofluorononyl methacrylate and 50 parts of methyl methacrylate in the presence of tert-butyl peroctoate in the manner described in Example 2.

A transparent, hard and semi-rigid lens is prepared from a polymerized plug obtained by the copolymerization of 70 parts of 1,1,9-trihydrofluorononyl methacrylate and 30 parts of methyl methacrylate in the same manner.

EXAMPLE 8

The copolymerization of 37 parts of 1,1,9-trihydrofluorononyl methacrylate and 63 parts of lauryl methacrylate in the presence of tert-butyl peroctoate at 90° C., in the manner described in Example 2, gives a soft, transparent plug.

EXAMPLE 9

A semi-rigid, hard, transparent lens is obtained by the polymerization of a mixture of 35 parts of 1,1,9-trihydrofluorononyl methacrylate, 35 parts of lauryl methacrylate, 25 parts of methyl methacrylate and 5 parts of hydroxyethyl methacrylate using tert-butyl peroctoate as catalyst at 90° C.

EXAMPLE 10

A mixture of 37 parts of 1,1,9-trihydrofluorononyl methacrylate, 56 parts of octadecyl methacrylate and 7 parts of methyl methacrylate is polymerized at 90° C. for 1 hour using tert-butyl peroctoate as catalyst. The resultant lens is transparent and semi-rigid.

EXAMPLE 11

The polymerization of a mixture of 70 parts of 1,1,9-trihydrofluorononyl methacrylate, 20 parts of methyl methacrylate, 5 parts of hydroxyethyl methacrylate and 5 parts of ethylene glycol dimethacrylate in the presence of tert-butyl peroctoate at 90° C. gives a transparent, hard, rigid, wettable lens.

EXAMPLE 12

A disc is prepared in the manner described in Example 1 from a mixture of 35 parts of 1,1,9-trihydrofluorononyl methacrylate, 20 parts of octadecyl methacrylate, 40 parts of methyl methacrylate and 5 parts of hydroxyethyl methacrylate using tert-butyl peroxypivalate as catalyst. The polymerization is carried out at 50° C. for 20 hours. The resultant disc is colorless, transparent, hard and rigid. The oxygen permeability of the polymer is 160 cc.-mil/100 in.$^2$/24 hr./atm.

EXAMPLE 13

A disc prepared in the manner described in Example 1 by polymerizing a mixture of 35 parts of 1,1,9-trihydrofluorononyl methacrylate, 10 parts of octadecyl methacrylate, 50 parts of methyl methacrylate and 5 parts of hydroxyl methacrylate in the presence of tert-butyl peroxypivalate at 50° C. for 20 hours has an oxygen permeability of 140 cc.-mil/100 in.$^2$/24 hr./atm. Lenses machined from the disc are transparent, hard and rigid.

EXAMPLE 14

A cylindrical plug is prepared in the manner described in Example 2 from 45 parts of 1,1,11-trihydrofluoroundecyl methacrylate and 55 parts of methyl methacrylate in the presence of tert-butyl peroxypivalate at 70° C. Lenses prepared from the polymeric plug are hard, transparent and oxygen-permeable.

EXAMPLE 15

A plug is prepared from 40 parts of 1,1-dihydrofluorooctyl methacrylate and 60 parts of methyl methacrylate using tert-butyl peroxypivalate as catalyst at 50° C. Lenses prepared from the plug are hard, transparent and oxygen-permeable.

Having described my invention and the various preferred embodiments thereof,

I claim:

1. As a new article of manufacture, a contact lens having increased oxygen permeability, said lens being fabricated from a composition having a refractive index from 1.35 to 1.50, said composition being a solid copolymer of comonomers consisting essentially of:

(a) about 10 to 90 parts by weight of a fluoroalkyl ester of the structure

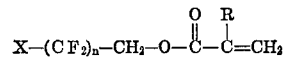

wherein:
(1) X is selected from the class consisting of hydrogen and fluorine;
(2) R is selected from the class consisting of methyl groups and hydrogen; and
(3) $n$ is an integer from one to 17; and (b) about 90 to 10 parts by weight of an ester of a $C_1$–$C_{20}$ monohydric alkanol and an acid selected from the class consisting of acrylic and methacrylic acid.

References Cited

UNITED STATES PATENTS 3,341,497 9/1967 Sherman et al. —————— 260—72
3,455,889 7/1969 Coleman —————————— 260—80.72

STANFORD M. LEVIN, Primary Examiner

U.S. Cl. X.R.

260—80.72, 80.73, 80.75, 808; 351—160

Notice of Adverse Decision in Interference

In Interference No. 98,825, involving Patent No. 3,808,179, N. G. Gaylord, OXYGEN-PERMEABLE CONTACT LENS COMPOSITION, METHODS AND ARTICLE OF MANUFACTURE, final judgment adverse to the the patentee was rendered Apr. 30, 1975, as to claim 1.

[*Official Gazette August 5, 1975.*]